United States Patent Office 3,183,232
Patented May 11, 1965

3,183,232
O,S-DISUBSTITUTED THIOL-TYPE THIAMINES
Akira Takamizawa, Osaka, Japan, assignor to Shionogi & Co., Ltd., Osaka, Japan
No Drawing. Filed May 27, 1963, Ser. No. 283,537
Claims priority, application Great Britain, Feb. 6, 1963, 4,916/63
4 Claims. (Cl. 260—256.5)

This invention relates to thiol-type thiamine derivatives, particularly to O,S-disubstituted thiol-type thiamines, and production thereof.

The said O,S-disubstituted thiol-type thiamines are representable by the formula:

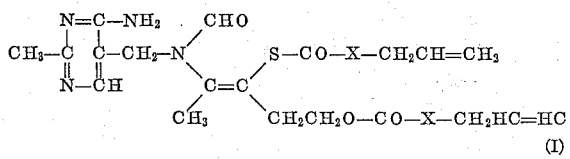
(I)

wherein X is an oxygen atom or a sulfur atom. These O,S-disubstituted thiol-type thiamines show anti-inflammatory activity.

Accordingly, a basic object of the present invention is to embody novel thiol-type thiamine derivatives and processes for their production. Another object of the present invention is to embody thiol-type thiamine derivatives useful as anti-inflammatory agents. These and other objects will be apparent to those skilled in the art to which the present invention pertains from the subsequent description.

O,S-disubstituted thiol-type thiamines of Formula I are prepared by the interaction of alkali metal salts of thiol-type thiamine represented by the formula:

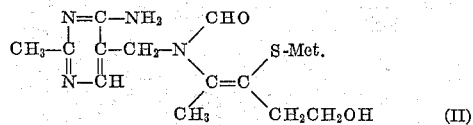
(II)

wherein Met. is an alkali metal (e.g. potassium, sodium) with reagents represented by the formula:

$$X'-CO-X-CH_2CH=CH_2 \quad (III)$$

wherein X' is a halogen atom (e.g. chlorine, bromine) and X has the same significance as designated above.

The starting compounds, alkali metal salts of thiol-type thiamine of Formula II, may be prepared by reacting thiamine chloride hydrochloride with alkaline substances such as alkali metal, alkali metal hydroxide and alkali metal alkoxide according to a conventional manner. For instance, the sodium salt of thiol-type thiamine is prepared by treating thiamine chloride hydrochloride with three molar amounts of sodium alkoxide in a lower alkanol at room temperature (15 to 20° C.). Although the production of O,S-disubstituted thiol-type thiamines (I) is illustrated independently below, it may be carried out subsequent to the preparation of the alkali metal salts of thiol-type thiamine (II).

The production of the objective compound (I) may be accomplished by treating an alkali metal salt of thiol-type thiamine (II) with an equimolar amount of the said reagent (III) in water at room temperature (15 to 30° C.), if necessary, in the presence of a basic substance such as trialkylamine, pyridine base and dialkylaniline, recovering the produced S-substituted thiol-type thiamine represented by the formula:

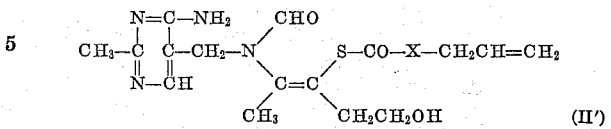
(II')

wherein X has the same significance as designated above from the reaction mixture in a per se conventional separation procedure, and subjecting the intermediate of Formula II' to treatment with at least an equimolar amount of the said reagent (III) in an inert organic solvent such as lower alkanol (e.g. methanol, ethanol), halogeno(lower)alkane (e.g. chloroform, dichloromethane), lower alkanone (e.g. acetone) and the mixture thereof in the presence of at least an equimolar amount of a basic catalyst such as alkali metal (e.g. metallic sodium), alkali metal alkoxide (sodium methoxide, sodium ethoxide) and tertiary amine (e.g. trimethylamine, triethylamine, dimethylaniline, pyridine) at a temperature from room temperature (15 to 30° C.) to reflux temperature, preferably 20 to 60° C.

Alternatively, the same object may be attained by reacting an alkali metal salt of thiol-type thiamine (II) with at least two equimolar amounts of the reagent (III) in an inert organic solvent such as lower alkanol, halogeno (lower) alkane, lower alkanone and the mixture thereof in the presence of at least an equimolar amount of a basic catalyst such as alkali metal, alkali metal alkoxide and tertiary amine at a temperature from room temperature to reflux temperature, preferably 20 to 60° C. This one-step procedure may appear to be superior to the three-step procedure above mentioned in simple operation. However, the adaptation of the latter is preferred for the industrial production, because it affords the objective compound (I) at a considerably better yield than the former does.

The thus-produced O,S-disubstituted thiol-type thiamines (I) can be readily recovered in crude state from the reaction mixture according to a per se conventional manner (e.g. solvent procedure), but contaminating impurities may cause too difficult crystallization of the products in free state. Therefore, in general, O,S-disubstituted thiol-type thiamines (I) may be crystallized as the hydrochloride for purification. Thus, it is recommended to execute an operation treating the crude product with hydrochloric acid in the presence of chloroform in the course of recovery of the product from the reaction mixture. For instance, the solution of the crude product in chloroform may be shaken with hydrochloric acid, usually diluted (about 3 to about 15%) hydrochloric acid. According to this operation, the product is converted into the hydrochloride which is soluble in chloroform, while the impurities are retained in the hydrochloric acid phase. The resultant hydrochloride is readily crystallized and purified according to a crystallization procedure. The conversion of the hydrochloride into the free base can be attained, for instance, by dissolving the hydrochloride in water, adjusting the pH of the solution at about 7 thereby the crystals of the free base being precipitated and collecting the precipitated crystals or by dissolving the hydrochloride in water, shaking the solution with chloroform in alkalinity with sodium bicarbonate and evaporating the solvent from the chloroform phase thereby the free base being obtained.

The products of the present invention are O,S-disubstituted thiol-type thiamines (I) which include O,S-diallyloxycarbonylthiamine and O,S-diallylthiocarbonylthiamine. These compounds and non-toxic salts thereof possess anti-inflammatory activity and also show rapid, prolonged and high level vitamin $B_1$ activity.

The O,S-disubstituted thiol-type thiamines (I) are administered in dosage unit form, as carried by a suitable pharmaceutical carrier, to human beings particularly for treatment of inflammation and vitamin $B_1$ deficiency. Normally the preparation is orally administered, although those likewise are effective when otherwise administered. Those may be administered in various dosages such as 10, 20, 30, 50, 100, 150, 200, or 300 milligrams, although the unit dosage range may vary more broadly from about 5 to about 500 milligrams and preferably from about 10 to about 300 milligrams. Those may be added to or otherwise used with various pharmaceutical carriers. By way of exemplification, various solid carriers may be employed such as lactose, mannitol, corn starch, talc and magnesium stearate as well as other tableting aids and fillers. If desired, some other ingredients such as riboflavin, pyridoxin, folic acid, biotin, inositol, mineral salts and the like may be mixed with the said active ingredients. The medicinal mixture may then be tableted or encapsulated in a hard gelatine capsule, depending on the commercial unit form desired. Ordinarily tableting is preferred. The amount of carrier or diluent may vary, according to tablet size desired or whether the dosage is made up in encapsulated form, from zero amount to the maximum amount consistent with the practical limits of bulk for a dosage unit. Normally the carrier with which the medicament is mixed does not exceed about 300 to 500 milligrams.

The following examples illustrate methods of carrying out the present invention, but it is to be understood that these examples are given for purpose of illustration and not of limitation.

In the examples which follow, the abbreviations have the following significances: g., gram(s); ml., millilitre(s); Analysis Calcd., analysis calculated; and ° C., degrees centigrade. Other abbreviations have conventional significances. Also, "Thia." represents the partial structure encompassed by the dotted line in the following formula of thiamine:
Land2°,

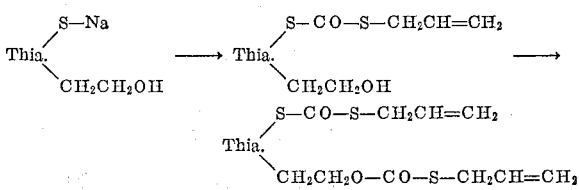

Example 1

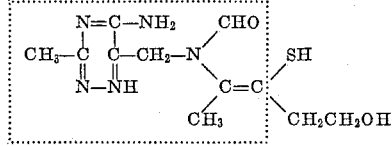

To a solution of thiamine chloride hydrochloride (30 g.) in water (25 ml.), there is added a solution of sodium hydroxide (10 g.) in water (25 ml.) while ice-cooling, and the resultant solution is allowed to stand for 30 minutes. After the addition of allyl chlorocarbonate (10 g.), the resulting mixture is stirred for a while at room temperature (15 to 30° C.) to precipitate crystals. The crystals are collected by filtration and recrystallized from ethyl acetate to yield S-allyloxycarbonylthiamine (18.5 g.) as colorless pillars melting at 135° C. (decomp.).

*Analysis.*—Calcd. for $C_{16}H_{22}O_4N_4S$: C, 52.45; H, 6.05. Found: C, 52.30; H, 6.28.

To a solution of metallic sodium (0.314 g.) in 99% ethanol (50 ml.), there is added S-allyloxycarbonylthiamine (5 g.), and the resultant solution is stirred for 10 minutes at 20 to 22° C. After the addition of allyl chlorocarbonate (1.66 g.), the resulting mixture is stirred for 5 minutes at room temperature (15 to 30° C.). The reaction mixture is concentrated under reduced pressure and the residue shaken with chloroform (200 ml.). The chloroform extract is washed with aqueous sodium bicarbonate and water in order and shaken with 15% hydrochloric acid (20 ml.). The chloroform layer is dried over anhydrous magnesium sulfate and the solvent evaporated. The residue is crystallized from acetone to give O,S-diallyloxycarbonylthiamine hydrochloride (3.5 g.) as fine crystals melting at 125 to 126° C. (decomp.).

*Analysis.*—Calcd. for $C_{20}H_{26}O_6N_4S \cdot HCl$: C, 49.40; H, 5.59; N, 11.25. Found: C, 49.28; H, 5.80; N, 11.37.

By treatment of O,S-diallyloxycarbonylthiamine hydrochloride with aqueous sodium hydroxide, there is obtained O,S-diallyloxycarbonylthiamine.

Example 2

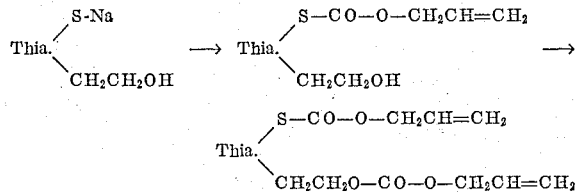

To a solution of thiamine chloride hydrochloride (13.4 g.) in water (15 ml.), there is added a solution of sodium hydroxide (4.75 g.) in water (6 ml.) while ice-cooling, and the resultant solution is allowed to stand for 30 minutes. After the addition of allyl chlorothiocarbonate (5.45 g.), the resulting mixture is stirred for a while at room temperature (15 to 30° C.) whereby an oily substance is separated. While stirring is continued for 1 hour, the oily substance is gradually solidified. The solid is collected by filtration, washed with saturated aqueous sodium chloride and dried under reduced pressure to give crude crystals (12.2 g.). The crude crystals are recrystallized from ethyl acetate to give S-allylthiocarbonylthiamine as colorless needles melting at 133° C. (decomp.).

*Analysis.*—Calcd. for $C_{16}H_{22}N_4O_3S_2$: C, 50.25; H, 5.76; N, 14.65. Found: C, 50.37; H, 5.89; N, 14.38.

To a solution of metallic sodium (1.80 g.) in 99% ethanol (180 ml.), there is added a solution of S-allylthiocarbonylthiamine (20 g.) in 99% ethanol (200 ml.), and the resultant solution is stirred for 20 minutes at 20 to 22° C. After the addition of allyl chlorothiocarbonate (12.35 g.) while ice-cooling, the resulting mixture is stirred for 25 minutes at room temperature (15 to 30° C.) and then for 30 minutes at 48° C. The separated sodium chloride is removed by filtration. The filtrate is evaporated under reduced pressure. The residue is dissolved in water and shaken with chloroform. The chloroform extract is washed with 2% acetic acid and shaken with 10% hydrochloric acid (80 ml.). The chloroform layer is dried over anhydrous magnesium sulfate and the solvent evaporated. The residue is washed with ether and crystallized from ethyl acetate to give crude crystals (21.5 g.). The crude crystals are recrystallized from acetone to give O,S-diallylthiocarbonylthiamine hydrochloride (17.9 g.) as colorless prisms melting at 132° C. (decomp.).

*Analysis.*—Calcd. for $C_{20}H_{26}O_4N_4S_3 \cdot HCl$: C, 46.25; H, 5.20; N, 10.78. Found: C, 46.82; H, 5.37; N, 11.67.

By treatment of O,S-diallylthiocarbonylthiamine hydrochloride with aqueous sodium hydroxide, there is obtained O,S-diallylthiocarbonylthiamine.

What is claimed is:
1. O,S-diallyloxycarbonylthiamine.
2. O,S-diallyloxycarbonylthiamine hydrochloride.
3. O,S-diallylthiocarbonylthiamine.
4. O,S-diallylthiocarbonylthiamine hydrochloride.

References Cited by the Examiner
UNITED STATES PATENTS 2,752,348  6/56  Matsukawa et al. _____ 260—256.5
3,109,000  10/63  Kawasaki et al. _____ 260—256.5

OTHER REFERENCES

Lowy et al.: An Introduction to Organic Chemistry, page 213, 1945.

Nagawa et al.: Annual Rep. of Takamine Lab., volume 13, 1961, pages 20–23.

Yoshioka et al.: Annual Rep. of Takamine Lab., volume 13, 1961, pages 35–36.

NICHOLAS S. RIZZO, *Primary Examiner.*